C. H. PIXLEY.
INSTRUMENT FOR DETECTING HETEROPHORIA.
APPLICATION FILED NOV. 26, 1913.
1,091,701.
Patented Mar. 31, 1914.
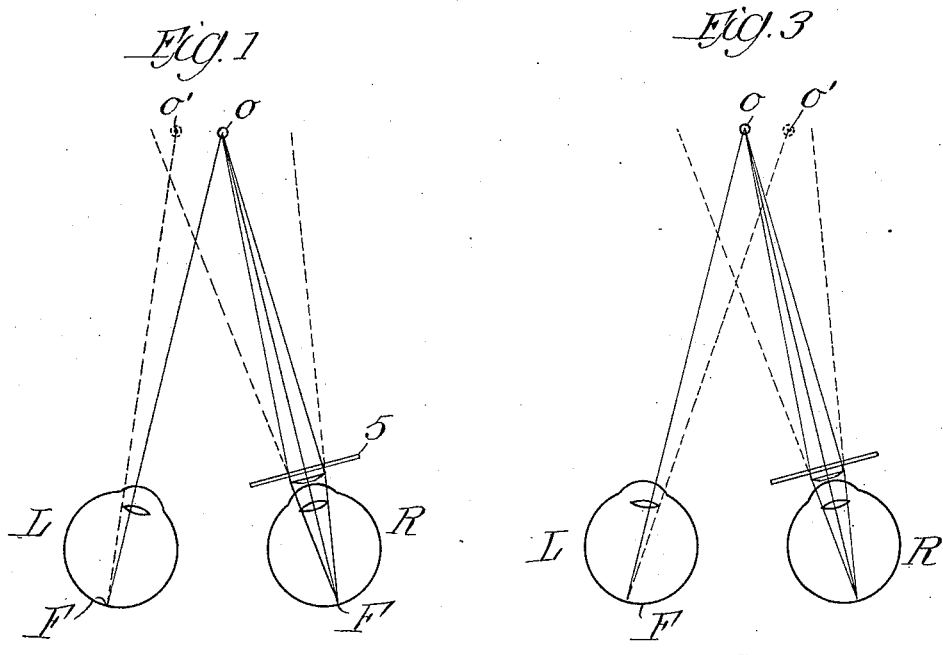
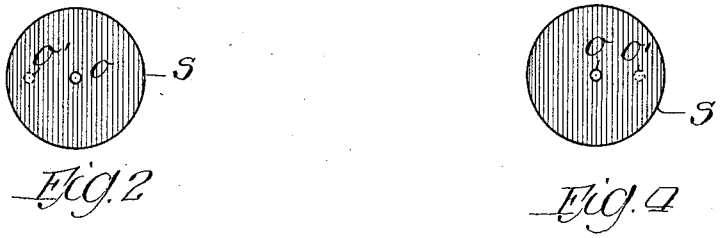
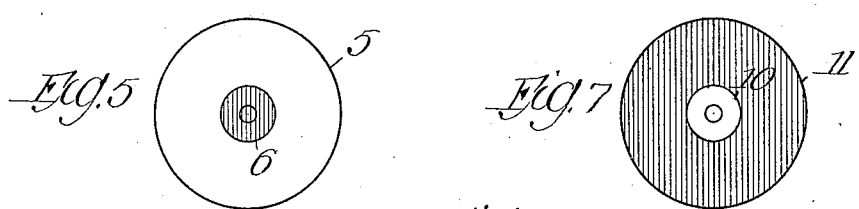
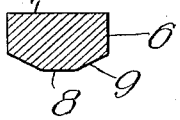

UNITED STATES PATENT OFFICE.

CHARLES H. PIXLEY, OF AUSTIN, ILLINOIS, ASSIGNOR TO F. A. HARDY & CO., OF CHICAGO, ILLINOIS, A CORPORATION OF ILLINOIS.

INSTRUMENT FOR DETECTING HETEROPHORIA.

1,091,701.  Specification of Letters Patent.  Patented Mar. 31, 1914.

Application filed November 26, 1913. Serial No. 803,092.

*To all whom it may concern:*

Be it known that I, CHARLES H. PIXLEY, a citizen of the United States, residing at Austin, in the county of Cook and State of Illinois, have invented certain new and useful Improvements in Instruments for Detecting Heterophoria, of which the following is a specification.

My present invention relates in general to eye testing apparatus and has more particular reference to an instrument for testing the condition of the muscular apparatus of the eye with a view to ascertaining whether or not the muscles are balanced.

It is well known to those familiar with optics and with the structure and functions of the eye that when both eyes are in equilibrium or equipoise and therefore capable of fixing an observed object so that each eye has the image of the object on its fovea the foveal images or impressions are transmitted to the brain and fused as one image in the visual centers. Such a condition is known as orthophoric. When, however, the eyes are heterophoric so that one eye only fixes the object and the other eye receives the image of the same object on a part of its retina remote from the fovea, the brain takes note of two separate impressions, resulting in double vision, commonly known as diplopia.

The primary object of my present invention is the provision of an instrument, by means of which the strength and action of the ocular recti, or extraneous muscles of the eyes can be tested and determined for the purpose of providing the necessary refractive agencies or media to counteract or correct any deficiency or inequality in the action of these muscles.

Other objects of my invention and many of its attendant advantages will be apparent to those skilled in the art as the same becomes better understood by reference to the following description, when considered in connection with the accompanying sheet of drawings.

Referring to the drawings, Figure 1 is a diagrammatic view illustrating the manner in which my novel instrument is utilized and indicating the apparent positions of an object impressed upon the visual centers when the eyes are afflicted with exophoria; Fig. 2 is a view indicating the apparent positions of the object point as seen by the eyes in Fig. 1; Fig. 3 is a view similar to Fig. 1, illustrating the images produced when the eyes are affected with esophoria; Fig. 4 is a view similar to Fig. 2, showing the images observed by the eyes in Fig. 3; Fig. 5 is a plan view of an instrument embodying my invention; Fig. 6 is a side view of the instrument shown in Fig. 5; Fig. 7 is a plan view of a modified form of the instrument shown in Figs. 5 and 6; Fig. 8 is a side view of the instrument shown in Fig. 7, and Fig. 9 is a longitudinal sectional view through my improved prism.

On the drawings and referring more particularly to Fig. 1 the right eye R fixes the object O so that the image falls upon the fovea F. The left eye L, however, is turned inward so that the rays from object O fall upon its retina to the nasal side of the fovea F' and are projected outward to the temporal side with the result that the left eye sees a false object O' to the left of the real object O. In order to detect this insufficiency or muscular unbalance I utilize an instrument comprising a plate of glass 5 (Fig. 5) and a prism 6, preferably of cobalt blue glass. This prism, as will be apparent from Figs. 5 and 6, is cylindrical in cross section with its base 7 (Fig. 9) which is secured to the plate 5 perpendicular to its axis. The other end of the prism, however, is frusto-conical in shape, forming the flat circular top 8 surrounded by the conical sides 9. Let us assume that this instrument, which may be mounted in a suitable holder (not shown), is positioned before the right eye of Fig. 1. When the instrument is first placed in front of the right eye the left eye is preferably closed or an opaque object may be placed before it. The rays passing from the object O, which in this test is preferably a source of light, through the flat top 8 of the prism 6, are undeviated and the eye receives an impression of the source of light upon its fovea F, the object having, however, a blue appearance resulting from the passage of the light through the cobalt blue glass. The rays which strike the conical sides 9 around the top 8 are refracted and to the eye apparently proceed from points surrounding the object O, the resultant impression upon the eye being a round luminous spot, or circle, indicated by reference character S (Fig. 2). If the left eye is now opened or the opaque object is withdrawn from in front of it, this eye sees the false object O' at the left of the real object O. In order that the patient may clearly distinguish the object apparently seen by the two eyes it is preferable to place a plain colored glass before the left eye so that its image will appear colored. Preferably red glass is employed although any color which is readily distinguishable from the cobalt blue impression produced by the prism 6 may be used.

Figs. 3 and 4 show the right eye R fixing the object O, but in this instance the left eye is turned outward instead of inward as shown in Fig. 1, with the result that the rays from O fall upon the retina to the temporal side of the fovea F' and are projected to the nasal side with the result that the left eye sees a false object O' to the right of the real object. By positioning my improved instrument before the right eye this eye receives the impression of the round luminous spot S surrounding the object O (Fig. 4) similar to the impression previously described in connection with Fig. 2. As a result of the tendency of the visual axis of the left eye to deviate inward this eye sees the false object O' to the right of the real object.

While I have explained and illustrated my instrument as applied to the perfect eye in each instance it will be manifest that it may be placed in front of the imperfect eye, in which case the false image O' will appear in the center of the luminous spot produced by the prism and the real image will be seen by the other eye at one side of the false image. The prism may therefore be placed in front of either eye and this eye will then see a luminous spot surrounding the object. If the eyes have perfect muscular balance, the object seen by the eye which has no prism in front of it will be superimposed upon the object in the center of the luminous spot seen by the eye through the prism. If error exists in the muscular balance the false object will appear at one side or the other of the real object seen through the prism, depending upon whether esophoria or exophoria exists. If vertical muscular error is present the false object will appear either above or beneath the real object in the center of the luminous spot seen through the prism, depending upon whether right or left hyperphoria exists. If the false object appears in one of the quadrants of the luminous spot, neither in a vertical or horizontal line with the true object, such a position indicates both vertical and lateral error and the quadrant in which the false object appears indicates whether the error is upward or downward, and also whether it is right or left.

Having determined by my invention what character of muscular error is present suitable charts of any preferred type may be employed for the purpose of determining the exact amount of error, so that the necessary refractive agencies necessary to counteract or correct such insufficiency or inequality may be provided.

It will be manifest that the use of a prism, such as above described, produces the impression on the eye, viewing the source of light through the prism, of a luminous spot with the source of light located exactly in the center thereof. This impression is clear and distinct and when the source of light is then observed by the other eye the patient is able to tell with considerable accuracy the relative positions of the true and false objects. My instrument is therefore superior to the Maddox rod or other instruments which have heretofore been employed for the purpose of making this test, for the reason that the true object appears as a small spot in the center of a large luminous ring and the position of the false object in this ring and with respect to the true object in the center of the ring, may be determined with greater accuracy by the patient than it is possible to determine or define a relative position of a line of light and an object, for the reason that the line of light has no definitely defined center.

My improved prism when made of cobalt blue glass is also suitable for making chromo-aberration tests and therefore possesses double utility and value. While I prefer to make my improved prism of cobalt blue glass and to mount the same upon a plain glass plate 5, as shown in Figs. 5 and 6, I may, if preferred, make the prism of plain glass as indicated by reference character 10 (Figs. 7 and 8) and mount the same upon a plate of cobalt blue glass. Such a construction will produce the same result as the cobalt blue prism on a plain glass and be equally efficacious in both the phorometry and chromo-aberration tests.

It is believed that my invention and its manner of use will be fully understood from the foregoing without further description and it will be obvious that the size, proportions, color and exact contours of the prism may be varied within considerable limits without departing from the spirit of my invention or sacrificing any of its material advantages.

I claim:

1. An instrument for testing the extraneous muscles of the eye, comprising a truncated conical prism adapted to be positioned in front of the eye and constructed to permit the undeviated passage of rays through the center thereof and to refract the rays intercepted by the inclined sides of the cone.

2. An instrument for testing the extraneous muscles of the eye, comprising a cylindrical prism having one end of frusto conical shape to permit the undeviated passage of light rays through the flat top of the prism and to refract the rays intercepted by the inclined sides of said frusto conical end.

3. An instrument for testing the extraneous muscles of the eye, comprising a cylindrical prism having one end disposed in a plane normal to the longitudinal axis of the prism and the other end of frusto conical shape, whereby upon observation of a source of light through said prism an impression of a luminous spot surrounding the true source of light is produced.

4. The combination with a source of light of a prism adapted to be positioned before the eye and constructed to permit the passage of a central beam of light therefrom undeviated to the eye and to refract surrounding beams so as to produce the image of a luminous round spot surrounding the true source of light.

5. The combination with a source of light, of means adapted to be positioned before the eye permitting the undeviated passage of light through the center thereof but refracting the surrounding rays so as to produce the impression on the eye of a luminous round spot surrounding the true source of light observed through the center of said means.

CHARLES H. PIXLEY.

Witnesses:
E. O. TROEGER,
E. S. CRAVEN.

Copies of this patent may be obtained for five cents each, by addressing the "Commissioner of Patents, Washington, D. C."